United States Patent
Kulkarni et al.

(10) Patent No.: US 11,855,914 B2
(45) Date of Patent: Dec. 26, 2023

(54) PERFORMING DISTRIBUTED DYNAMIC FREQUENCY SELECTION USING A SHARED CACHE

(71) Applicant: Cisco Technology, Inc., San Jose, CA (US)

(72) Inventors: Santosh B. Kulkarni, Sunnyvale, CA (US); Vishal S. Desai, San Jose, CA (US); Pooya Monajemi, Irvine, CA (US); Young Il Choi, San Jose, CA (US); Matthew A. Silverman, Shaker Heights, OH (US)

(73) Assignee: Cisco Technology, Inc., San Jose, CA (US)

( * ) Notice: Subject to any disclaimer, the term of this patent is extended or adjusted under 35 U.S.C. 154(b) by 178 days.

(21) Appl. No.: 16/698,573

(22) Filed: Nov. 27, 2019

(65) Prior Publication Data

US 2021/0160198 A1   May 27, 2021

(51) Int. Cl.
| | | |
|---|---|---|
| H04L 49/9005 | (2022.01) | |
| G06F 12/084 | (2016.01) | |
| G06F 12/0864 | (2016.01) | |
| H04L 43/067 | (2022.01) | |
| H04L 49/9047 | (2022.01) | |
| H04L 9/40 | (2022.01) | |

(52) U.S. Cl.
CPC ........ *H04L 49/9005* (2013.01); *G06F 12/084* (2013.01); *G06F 12/0864* (2013.01); *H04L 43/067* (2013.01); *H04L 49/9047* (2013.01); *H04L 63/20* (2013.01)

(58) Field of Classification Search
None
See application file for complete search history.

(56) References Cited

U.S. PATENT DOCUMENTS

| | | |
|---|---|---|
| 6,870,815 B2 | 3/2005 | McFarland et al. |
| 7,813,744 B2 | 10/2010 | Johnson |
| 7,944,886 B2 | 5/2011 | Stephenson et al. |

(Continued)

OTHER PUBLICATIONS

PCT Notification of Transmittal of the International Search Report and the Written Opinion of the International Searching Authority, or the Declaration for Application No. PCT/US2020/061552 dated Feb. 10, 2021.

(Continued)

*Primary Examiner* — Nicholas Sloms
(74) *Attorney, Agent, or Firm* — Patterson + Sheridan, LLP (57) ABSTRACT

Embodiments herein describe a group of APs that uses a shared radar cache to select a new channel after vacating a current channel when performing dynamic frequency selection (DFS). The group of APs can set aside memory to store status information about the DFS channels in the frequency band. For example, when one AP detects a radar event (and has to vacate a DFS channel), the AP updates an entry for that channel in the shared radar cache. The APs can also query the cache to determine a new channel after vacating its current channel. That is, the shared radar cache may store the most recent radar events occurring in a channel. In this manner, the APs can select a new channel that has little or no recent radar events, which reduces the likelihood the AP will have to vacate the new channel.

14 Claims, 7 Drawing Sheets

(56) References Cited

U.S. PATENT DOCUMENTS

| | | | | |
|---|---|---|---|---|
| 8,509,103 | B2* | 8/2013 | Gao | H04W 28/22 |
| | | | | 370/252 |
| 9,807,619 | B2 | 10/2017 | Tsai et al. | |
| 9,838,882 | B1 | 12/2017 | Yankevich et al. | |
| 10,237,749 | B2 | 3/2019 | Yankevich et al. | |
| 2004/0156336 | A1* | 8/2004 | McFarland | H04W 72/02 |
| | | | | 370/329 |
| 2008/0043655 | A1* | 2/2008 | Lee | H04L 12/4641 |
| | | | | 370/310.1 |
| 2008/0056200 | A1* | 3/2008 | Johnson | H04W 36/0085 |
| | | | | 370/333 |
| 2009/0052382 | A1* | 2/2009 | Stephenson | H04W 16/14 |
| | | | | 370/329 |
| 2010/0195497 | A1* | 8/2010 | Iyer | H04W 48/06 |
| | | | | 370/235 |
| 2012/0058728 | A1* | 3/2012 | Wang | H04W 72/085 |
| | | | | 455/62 |
| 2015/0055590 | A1* | 2/2015 | Wu | H04W 16/04 |
| | | | | 370/329 |
| 2015/0319728 | A1* | 11/2015 | Agarwal | H04L 67/16 |
| | | | | 709/224 |
| 2016/0128021 | A1* | 5/2016 | Wadhawan | H04W 24/10 |
| | | | | 370/312 |
| 2016/0294976 | A1* | 10/2016 | Ueno | H04L 67/32 |
| 2017/0041954 | A1* | 2/2017 | Tsai | H04W 16/14 |
| 2017/0078436 | A1* | 3/2017 | Ishihara | H04L 67/2842 |
| 2017/0094651 | A1* | 3/2017 | Green | H04L 43/062 |
| 2017/0150368 | A1* | 5/2017 | Ngo | G01S 5/02 |
| 2018/0295538 | A1* | 10/2018 | Monajemi | H04W 28/0252 |
| 2019/0246293 | A1* | 8/2019 | Halabian | H04W 72/10 |
| 2019/0342795 | A1 | 11/2019 | McFarland et al. | |
| 2021/0014732 | A1* | 1/2021 | Chen | H04W 48/20 |
| 2021/0311884 | A1* | 10/2021 | Grocutt | G06F 3/0638 |

OTHER PUBLICATIONS

U.S. Appl. No. 15/891,488, filed Aug. 2, 2018.

ip.com Disclosure No. IPCOM000242970D, "Faster Signaling Of Dynamic Frequency Selection (DFS) To Clients," Publication Date Sep. 3, 2015 (Abstract Only).

Cisco Kinetic Edge & Fog Processing Module, "Accelerate critcial decisions and optimize network use with distributed computing," 5 pages [ Accessed Online: https://www.cisco.com/c/dam/en/us/solutions/collateral/internet-of-things/kinetic-datasheet-efm.pdf ].

Cisco Public Datasheet, "Cisco IR829 Industrial Integrated Services Routers" 34 pages, Jun. 28, 2019.

Cisco Kinetic Data Sheet, "Cisco Kinetic Gateway Management Module (GGM) Provision, monitor, and manage Cisco industrial IoT gateways at scale," [ Accessed Online: < https://www.cisco.com/c/dam/en/us/solutions/collateral/internet-of-things/kinetic-datasheet-gmm.pdf> ].

Cisco Kinetic Data Control Module Whitepaper, "Enforcing policy and getting the right data to the right applications at the right time," 12 pages, [Accessed Online: https://www.cisco.com/c/dam/en/us/solutions/collateral/internet-of-things/kinetic-dcm-whitepaper.pdf ].

* cited by examiner

PERFORMING DISTRIBUTED DYNAMIC FREQUENCY SELECTION USING A SHARED CACHE

TECHNICAL FIELD

Embodiments presented in this disclosure generally relate to selecting a new channel after detecting a Dynamic Frequency Selection (DFS) event.

BACKGROUND

In many countries, regulatory requirements may limit the number of 5 GHz channels available or place additional restrictions on their use because the spectrum is shared with other technologies and services. For instance, in the United States and other countries, some of the Unlicensed National Information Infrastructure (U-NII) bands are used by radar systems. Wi-Fi networks operating in those bands are required to employ a radar detection and avoidance capability. The IEEE 802.11h standard addresses this requirement by adding support for DFS and transmit power control (TPC) on every DFS channel.

After detecting a radar event on a DFS channel, an access point (AP) is required to vacate that channel. This means the AP must select a new channel to use when communicating with its associated client devices. In some systems, a remote wireless local access network (WLAN) controller is used to select a new channel for the AP. However, waiting for the remote WLAN controller to select a new channel can add latency that increases downtime after detecting a radar event.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method that includes detecting, at a first access point (AP), a first event when operating on a dynamic frequency selection (DFS) channel causing the first AP to vacate the DFS channel, updating an entry corresponding to the DFS channel in a shared cache in response to the first event where the shared cache is shared by a plurality of APs and is hosted in memory of at least one of the plurality of APs, and selecting a new DFS channel at the first AP.

Another embodiment presented herein is a computing device that includes a processor and memory storing a program executable by the processor to perform an operation. The operation includes detecting a first event when operating on a DFS channel causing the computing device to vacate the DFS channel, updating an entry corresponding to the DFS channel in a shared cache in response to the first event where the shared cache is shared by a plurality of wireless computing devices and is hosted in memory of at least one of the plurality of wireless computing devices, and selecting a new DFS channel.

Example Embodiments

Embodiments herein describe a group of APs (e.g., a radio frequency (RF) neighborhood) that uses a shared radar cache to select a new channel after vacating a current channel when performing DFS. The group of APs can set aside memory to store status information about the DFS channels in the frequency band. For example, when one AP detects a radar event (and has to vacate a DFS channel), the AP updates an entry for that channel in the shared radar cache. The APs can also query the cache to determine a new channel after vacating its current channel. That is, the shared radar cache stores the most recent radar events occurring in a channel. In this manner, the APs can select a new channel that has little or no recent radar events recorded in the cache, which reduces the likelihood the AP will have to vacate the new channel (relative to selecting a channel that has experienced a more recent radar event). Thus, instead of selecting a random channel which may have experienced a recent radar event, the shared radar cache can steer the APs to a DFS channel with lower amounts of radar activity. Further, using the shared radar cache may offer lower latency than relying on a WLAN controller (e.g., a cloud-based WLAN controller) to select the new channel. Moreover, the shared radar cache can help to distinguish false alarms from read radar events.

Figure 1:
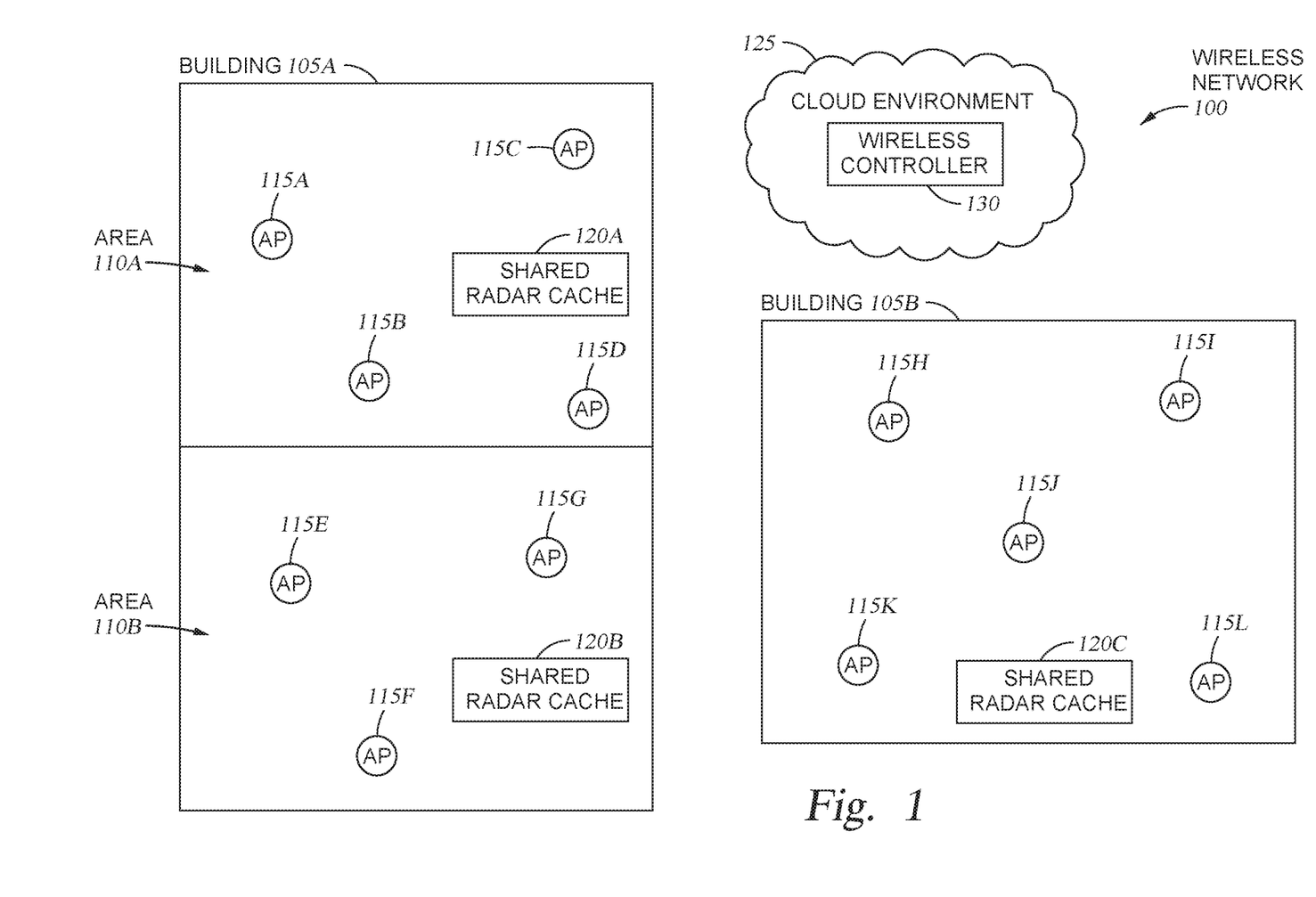
FIG. 1 illustrates a wireless network where groups of APs use shared radar caches, according to one embodiment.

FIG. 1 illustrates a wireless network 100 where groups of APs use shared radar caches, according to one embodiment. The wireless network 100 is deployed in an environment that includes multiple buildings 105A and 150B where the buildings can be divided into different areas 110. For example, the building 105A has area 110A and 1108 which can be different rooms, different floors in a multistory building, and the like.

The buildings 105A and 105B have APs 115A-L that establish the wireless network 100. In one embodiment, the APs 115 perform DFS by monitoring for radar (or other specified frequencies) and vacate a DFS channel when a radar event is detected. In one embodiment, the APs are assigned to different groups referred to herein as RF neighborhoods. In FIG. 1, the APs 115A-D in the area 110A are assigned to a first RF neighborhood, the APs 115E-G in the area 110B are assigned to a second RF neighborhood, and the APs 115H-L in the building 105B are assigned to a third RF neighborhood.

Each RF neighborhood has its own shared radar cache 120 (or more generally, a shared cache). That is, the APs 110A-D in the first RF neighborhood share the radar cache 120A, the APs 115E-G in the second RF neighborhood share the radar cache 120B, and the APs 115H-L in the third RF neighborhood share the radar cache 120C. As described in more detail below, the shared radar caches 120A-C provide a data store where the APs in the corresponding RF neighborhood can share radar events on the various DFS channels. That is, if the AP 115A detects a radar event in its current operating channel (e.g., a DFS channel), the AP 115A can update an entry in the shared radar cache 120A corresponding to the DFS channel to indicate when the event occurred (and when the event expires). Thus, when an AP 115 selects a new channel, it can query the shared radar cache 120 for its neighborhood to identify the channels where radar events have occurred least recently. Moving to one of these channels may reduce the likelihood the AP experiences a future radar event, and thus, would have to again vacate the new channel.

In one embodiment, the shared radar caches 120A-C are distributed caches that reside in the memory of some or all of the APs in the RF neighborhood. That is, the shared radar cache 120A may have entries in the memories of the APs 115A-D (or a subset thereof). Thus, by using AP-to-AP messages, the APs 115A-D can transmit updates to the shared radar cache 120A as well as query the cache 120A to identify recent radar activity on different DFS channels.

FIG. 1 also illustrates a cloud environment 125 that hosts a wireless controller 130. In this example, rather than having a wireless controller 130 (e.g., a physical computing system) located in the same physical environment as the APs 115—e.g., in one of the buildings 105A and 105B—the wireless controller 130 is hosted in the cloud environment 125 by hardware resources in a cloud computing environment. Traditionally, the wireless controller 130 has the best overall view of the wireless networks 100 and decides what channel an AP 115 should move to whenever it detects radar. While this approach significantly reduces co-channel interference in dense deployments when compared to alternatives like random channel selection, extending it to centralized, cloud-based solution (i.e., where the wireless controller 130 is located in the cloud environment 125) not only leads to significant increase in latency between radar detection and channel switches at the APs 115 (due to the remoteness of the cloud's data center) but also creates a spike in the volume of traffic flowing between the cloud and the APs for every radar detected.

In FIG. 1, the wireless controller 130 is hosted in the cloud environment 125, but the decision to select the new channel is perform locally by the APs 115 using the shared radar caches 120. Thus, the latency and the spike in the traffic to the cloud environment 125 can be reduced or eliminated. However, using a shared radar cache 120 is not limited to a deployment where the wireless controller 130 is disposed in a cloud environment 125. There may still be latency advantages to using a shared radar cache 120 when the controller 130 is located in, or near, the same physical environment as the APs 115. Further, the embodiments herein can be used in the wireless network 100 does not include any wireless (or WLAN) controller 130.

Figure 2:
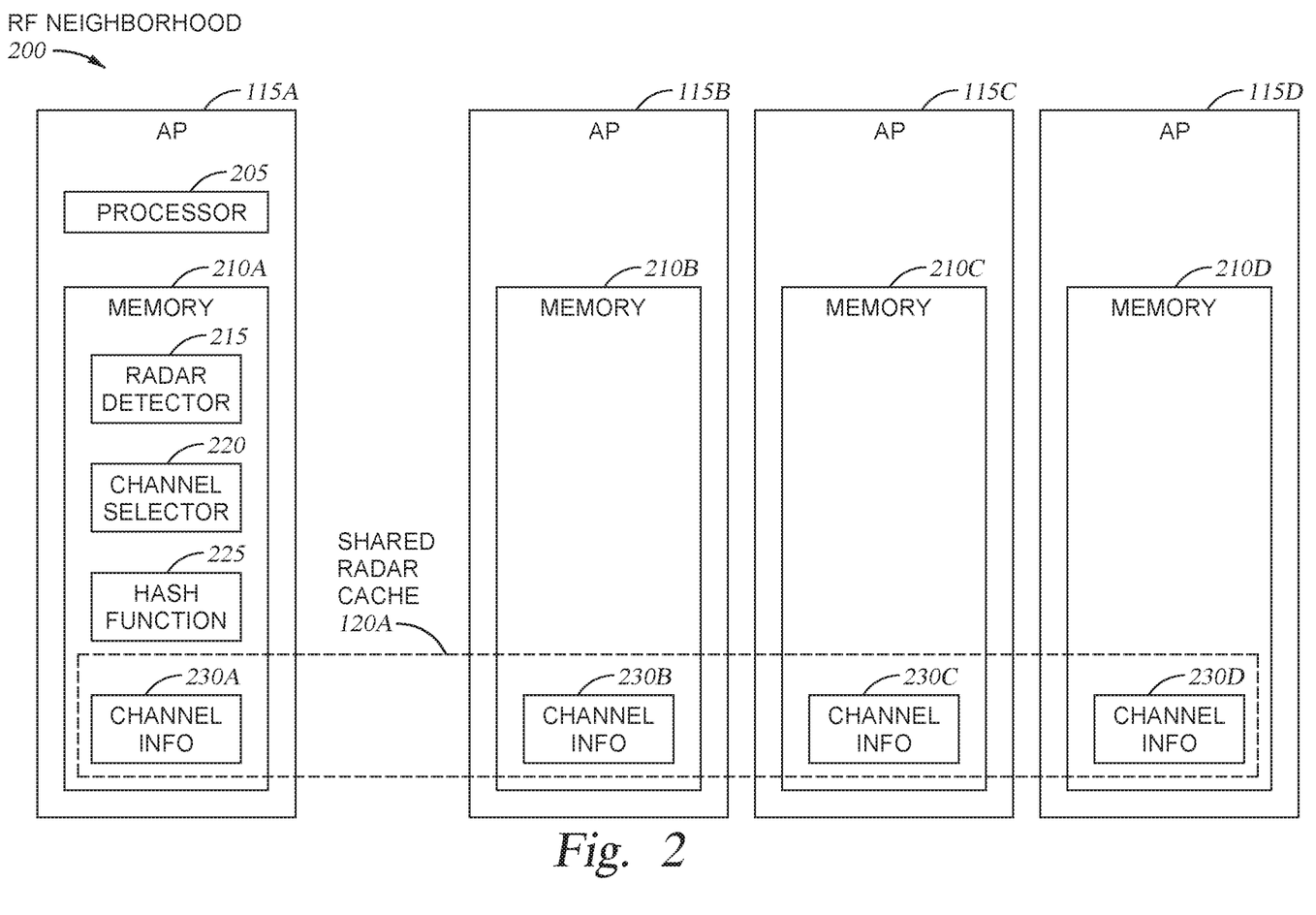
FIG. 2 illustrates a group of APs implementing a shared radar cache, according to one embodiment.

FIG. 2 illustrates a group of APs implementing a shared radar cache 120A, according to one embodiment. In FIG. 2, the group of APs 115A-D forms a RF neighborhood 200 that includes the shared radar cache 120A. In this example, the shared radar cache 120A is allocated portions of memory in each of the APs 115A-D. That is, a memory 210A in AP 115A includes channel information 230A, a memory 210B in AP 115B includes channel information 230B, a memory 215C in AP 115C includes channel information 230C, and a memory 215D in AP 115D includes channel information 230D. The channel information 230A-D forms the shared radar cache 120A and stores information about DFS channels. While the shared radar cache 120A is allocated a portion of each of the memories 210A-D, in other embodiments, the shared radar cache 120A may be allocated a portion in a subset of the memories 210A-D. For example, the AP 115A may have a larger workload than the other APs 115B-D, and thus, the shared radar cache 120A may use space in the memories 210B-D, but not the memory 210A. Further, while the shared radar cache 120A is shown as a distributed cache that is distributed across multiple APs 115, this is not a requirement. In one embodiment, the shared radar cache 120A may be hosted by a single AP 115 in the RF neighborhood 200.

In one embodiment, the shared radar cache 120A has backups in case an AP 115 goes offline (or is otherwise unavailable). That way, the portion of the cache 120A previously assigned to the offline AP can then be serviced by the backup AP. This improves the redundancy of the cache 120A The AP 115A includes a processor 205 which represents any number of processing elements that each can include any number of processing cores. The memory 210A can include volatile memory elements, non-volatile memory elements, and combinations thereof. In this example, the memory 210A includes a radar detector 215, a channel selector 220, a hash function 225, and the channel information 230A.

The radar detector 215 may be a software application, but in other embodiments can include firmware or hardware elements. The radar detector 215 performs DFS to determine when there is a radar event that requires the APs 115A to vacate its current channel. The radar detector 215 can use a variety of different technique for performing DFS, which are not described in detail herein. Regardless of the technique use, the radar detector 215 monitors a channel to identify a radar signal that would require the AP 115A to vacate its current DFS channel. Notably, the radar detector 215 can experience false positives where the detector 215 determines there was a radar event requiring it to vacate a channel, when in fact, there was no radar signal (e.g., a client device outputs a signal that appears to behave like a radar source). Recognizing that the radar detector 215 can detect false positive radar events, the embodiments below can help an AP to determine whether radar events stored in the shared radar cache 120A are likely real or false positive events when selecting a new channel.

The channel selector 220 may be a software application, but in other embodiments can include firmware or hardware elements. The channel selector 220 uses the channel information 230A-D in the shared radar cache 120A to identify a new channel for the AP 115A once a radar event has been detected on the current DFS channel.

In one embodiment, the radar detector 215 is tasked with updating the shared radar cache 120A when there is a radar event while the channel selector 220 is tasked with querying the shared radar cache 120A when the AP 115A selects a new channel. In one embodiment, the radar detector 215 and the channel selector 220 use the hash function 225 to identify predetermined locations or entries in the shared radar cache 120A that correspond to updates regarding the DFS channels. In one embodiment, the hash function 225 uses a DFS channel as a key to identify a unique storage location in the shared radar cache 120A. For example, the hash function 225 may indicate that data regarding DFS channel 44 should be stored in a memory location in the channel information 230A in AP 115A while data regarding DFS channel 100 is stored in a memory location in the channel information 230C in the AP 115C. In this manner, assuming the APs 115A-D use the same hash function 225, each AP can identify where information about a particular DFS channel is stored within the shared radar cache 120A. Of course, if the hash function 225 indicates that the memory location for a particular DFS channel is in the channel information 230A (i.e., the memory 210A of the AP 115A), then the radar detector 215 and channel selector 220 can update or query this memory location without using a wireless or wired packet. However, if the hash function 225 indicates the memory location is in one of the memories 210B-D of the other APs 115B-D, then the AP 115A can use an AP-to-AP message (either a wireless message or a wired message using a wired backend) to update or query that memory location.

For simplicity, only the various software and hardware elements for the AP 115A are shown. The APs 115B-D may have the same hardware and software elements as the AP 115A. That is, the APs 115B-D can have their own processors, radar detectors, channel selectors, etc.

Figure 3:
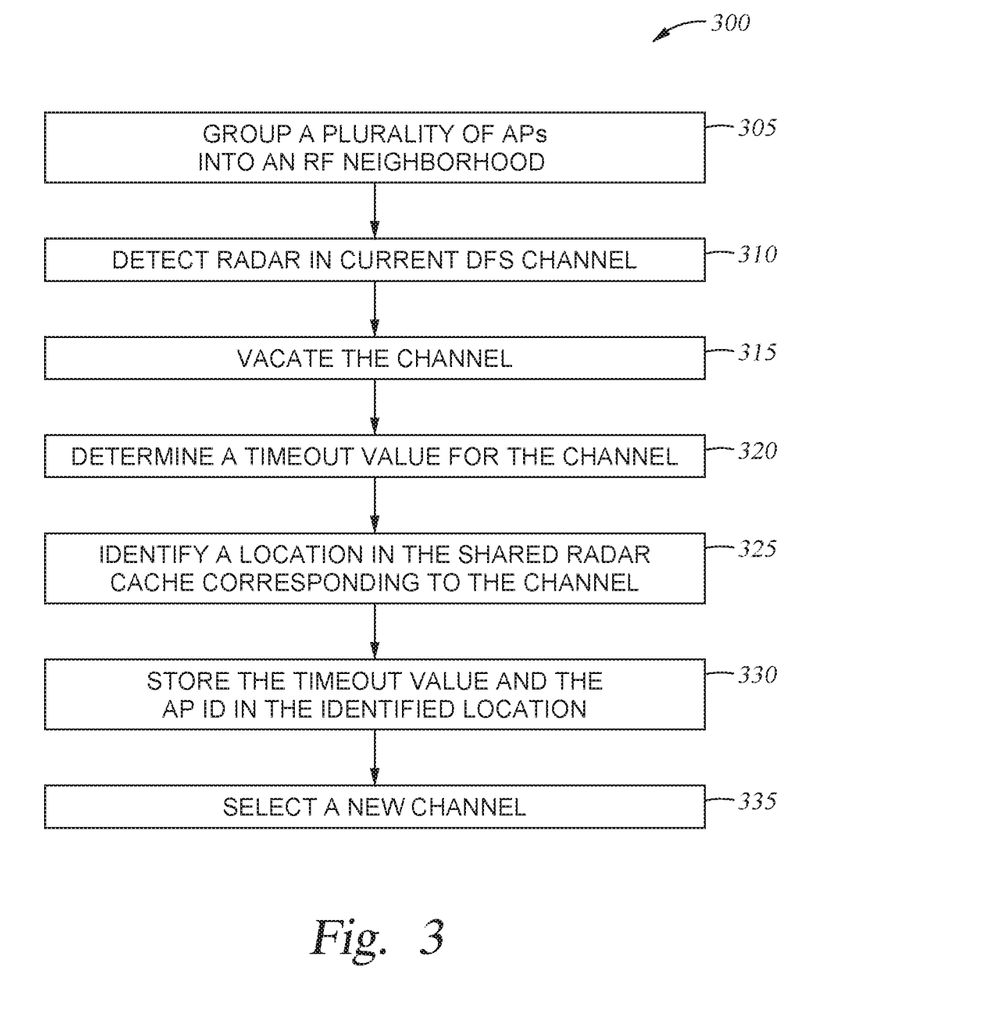
FIG. 3 is a flowchart for selecting a new channel in response to a radar event using a shared radar cache, according to one embodiment.

FIG. 3 is a flowchart of a method 300 for selecting a new channel in response to a radar event using a shared radar cache, according to one embodiment.

At block 305, a wireless controller groups a plurality of APs into an RF neighborhood. In one embodiment, a wireless deployment can have APs spread across different buildings in a campus, different office spaces, different floors, and different rooms. The wireless controller can use the physical locations of the APs to group them into different RF neighborhoods. For example, the APs in the same floor, building, or office space are assigned to the same RF neighborhood. In one embodiment, because the APs may rely on AP-to-AP messages to update and query the shared memory cache, the wireless controller may check that the APs in the same RF neighborhood are within wireless communication of each other. The wireless controller may use an automatic technique to assign each AP to a RF neighborhood (e.g., based on a received signal strength indicator (RSSI)). In another example, the wireless controller may receive input from a system administrator who provides guidance or instructions when assigning the APs to RF neighborhoods.

In one embodiment, the wireless controller can use a neighbor discovery packets (NDPs) to identify APs that can be grouped into the same RF neighborhood. The APs can transmit the NDPs (and receive NDPs transmitted by neighboring APs) which the wireless controller can use to determine which APs are in wireless communication. While it may be preferred that the APs in the same RF neighborhood are in direct communication with the other APs in the same RF neighborhood (either LOS or non-LOS communication), this is not a requirement. For example, some of the APs may be unable to directly communicate with other APs, but as long as each AP can communicate with the APs hosting the shared radar cache, this may be sufficient. For example, assume that APs 1-3 store the channel information for the shared radar cache. So long as APs 4 and 5 can communicate with the APs 1-3 then the APs 4 and 5 can be in the same RF neighborhood even if APs 4 and 5 cannot communicate directly with each other using an AP-to-AP message. In another example, some of the APs may be unable to directly communicate with other APs wirelessly, but as long as each AP can communicate with the APs hosting the shared radar cache, this may be sufficient.

At block 310, a radar detector in an AP detects radar in its current DFS channel. As mentioned above, the embodiments herein are not limited to any particular technique for performing DFS. The radar detector can perform any suitable technique that is also compatible with using a shared radar cache. Further, DFS detection is not limited to radar signals but can be any DFS event.

At block 315, the radar detector instructs the AP to vacate the DFS channel. For example, a protocol may indicate how quickly the AP must stop using a DFS channel once a radar event is detected. The AP may vacate the channel before the AP has selected a new channel.

At block 320, the radar detector determines a timeout value for the channel. The timeout value indicates the length of time the AP waits before it can again use the vacated channel. For example, a 30 minutes timeout period indicates that the AP is prohibited from using the vacated DFS channel for 30 minutes. The manner in which the radar detector generates the timeout value may vary according to the DFS technique being used and can depend on government imposed parameters.

At block 325, the radar detector identifies a location in the shared radar cache corresponding to the channel. In one embodiment, the radar detector uses a hash function to determine a location or address in the shared radar cache dedicated to the channel. However, a hash function is just one example. In another example, the wireless controller may provide the APs in the same RF neighborhood an address table indicating a location for storing data for each DFS channel. For example, the address table may indicate a particular AP and an address range in its memory for storing information regarding the DFS channel.

At block 330, the radar detector stores the timeout value and the AP ID in the identified location. If the location is on the same AP that detected the radar, then the AP merely updates its own memory (without having to transmit any wireless or wired messages to the other APs in the RF neighborhood). However, if the identified location is on a different AP, the radar detector can transmit the information regarding the radar event wirelessly or using a wired backend.

Figure 4:
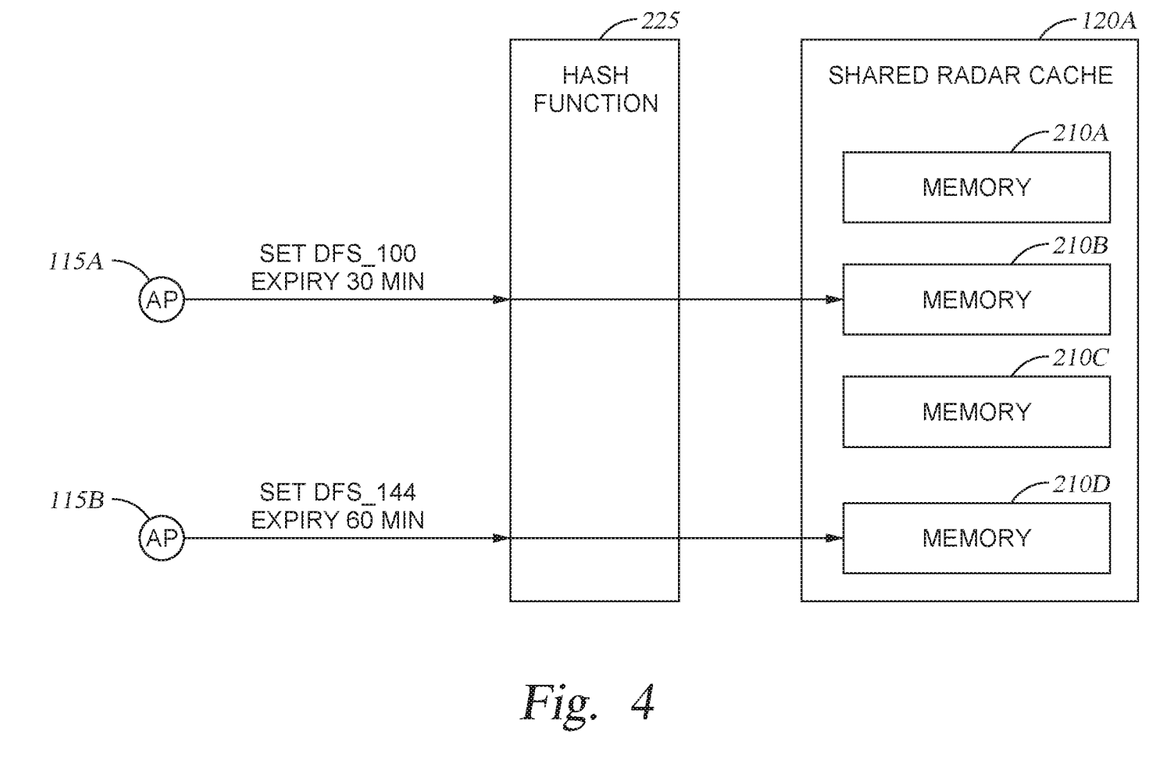
FIG. 4 illustrates updating a shared radar cache, according to one embodiment.

FIG. 4 illustrates updating the shared radar cache 120A, according to one embodiment. As shown, the radar detectors in the AP 115A and 115b have both detected radar events on their respective channels, DFS_100 and DFS_144. Further, the radar detector in the AP 115A has determined a 30 minute timeout value for its event while the radar detector in the AP 115b determined a 60 minute timeout value for its event. That is, the AP 115A will not use DFS_100 for 30 minutes while the AP 115b will not use DFS_144 for 60 minutes. These timeout value may be based on radar avoidance policy or government imposed restrictions.

The APs 115A and 115b use the hash function 225 to identify the particular memory 210 in the shared radar cache 120A that stores information about DFS_100 and DFS_144. In this case, the hash function 225 indicates that the memory 210B has an entry that stores information about DFS_100 while the memory 210D has an entry that stores information regarding DFS_144. These memories 210B and 210D happen to be on different APs, and thus, the APs 115A and 115b would use wireless or wired messages to pass the information to the identified memories. In this manner, the memories 210A-210D can be allocated to store information about multiple DFS channels. Using the hash function 225, the APs 115 can identify the corresponding storage location in the shared radar cache 120A and transmit the information to the appropriate destination AP.

In one embodiment, the shared radar cache 120A stores the most recent radar event. For example, if there were radar events already stored for DFS_100 and DFS_144 in the memories 210B and 210D, the information submitted by the APs 115A and 115B can overwrite that information. For example, assume that the AP 115C previously detected a radar event on DFS_100 which was stored in the memory 210B. Later, after the AP 115A detects the radar event for DFS_100 shown in FIG. 4, that information (e.g., a timestamp and the 30 minutes timeout period) overwrites the information provided by the AP 115C. In that embodiment, the shared radar cache 120A stores information about the most recent radar event for each channel. If the timeout value expires before another radar event is detected on that channel, the shared radar cache 120A may delete the information for that channel (e.g., clear out the entry corresponding to the DFS channel from the corresponding memory 210).

Rather than storing the information for only the most recent radar event, the shared radar cache 120A can store information regarding multiple radar events for each DFS channel. For example, if two APs report radar events on the same DFS channel, the shared radar cache 120A may store the information about both of these events. In one embodiment, once the timeout values for the radar events expires, the cache 120A may delete the information for that radar event from the corresponding location of the DFS channel.

Although not shown in FIG. 4, the APs 115A and 115B may also send (either explicitly or inherently) an AP ID which can be stored in the entries corresponding to the DFS channels. That is, the memory 210B can include an entry that has a timestamp indicating when the AP 115A detected a radar event on DFS_100 and that the timeout is set to expire in 30 minutes. As discussed below, knowing which of the APs detected the radar event on a particular channel may be useful information to another AP when it has to select a new channel—e.g., when another AP is evaluating whether DFS_100 is a good candidate.

Returning to the method 300, at block 335 the channel selector in the AP selects a new channel. This block is discussed in more detail in FIG. 5. Further, while blocks 310-335 are described above as being performed by an AP, these blocks may be performed by other wireless computing devices instead of an AP such as a client device or wireless router.

Figure 5:
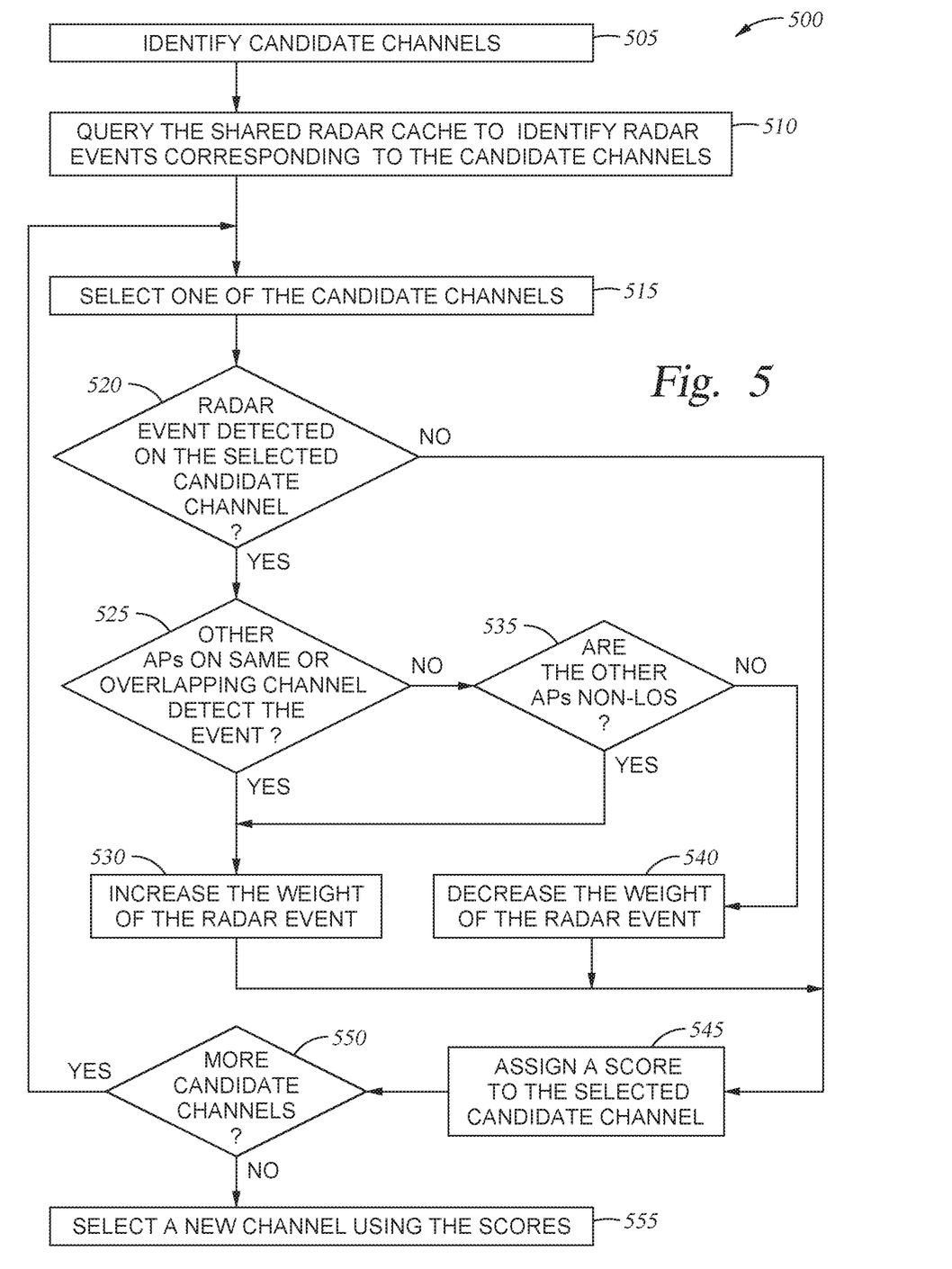
FIG. 5 is a flowchart for selecting a new channel using data retrieved from a shared radar cache, according to one embodiment.

FIG. 5 is a flowchart of a method 500 for selecting a new channel using data retrieved from a shared radar cache, according to one embodiment. The method 500 illustrates various techniques that a channel selector in an AP can use to select a new channel using data stored in the shared radar cache.

At block 505, the channel selector identifies candidate DFS channels. In one embodiment, the channel selector may use predefined criteria to select the DFS candidate channels from a complete list of DFS channels in a frequency band (e.g., the 5 GHz frequency band). In one embodiment, the channel selector may have locally stored data concerning one or more of the channels. For example, the channel selector may already know that one or more of the possible channels is overloaded and has contention issues. The channel selector can then eliminate these channels as potential candidate DFS channels. This supplemental channel information may be learned by (or provided to) the AP using any number of different techniques. However, in another embodiment, the channel selector may select all of the possible channels in a frequency band as the candidate channels.

At block 510, the channel selector queries the shared radar cache to identify radar events corresponding to the candidate channels. Similar to storing updates to the channels in the shared radar cache, the channel selector can use the hash function or an address table to identify locations in the shared radar cache dedicated to the candidate channels. One example of querying the shared radar cache is illustrated in FIG. 6.

Figure 6:
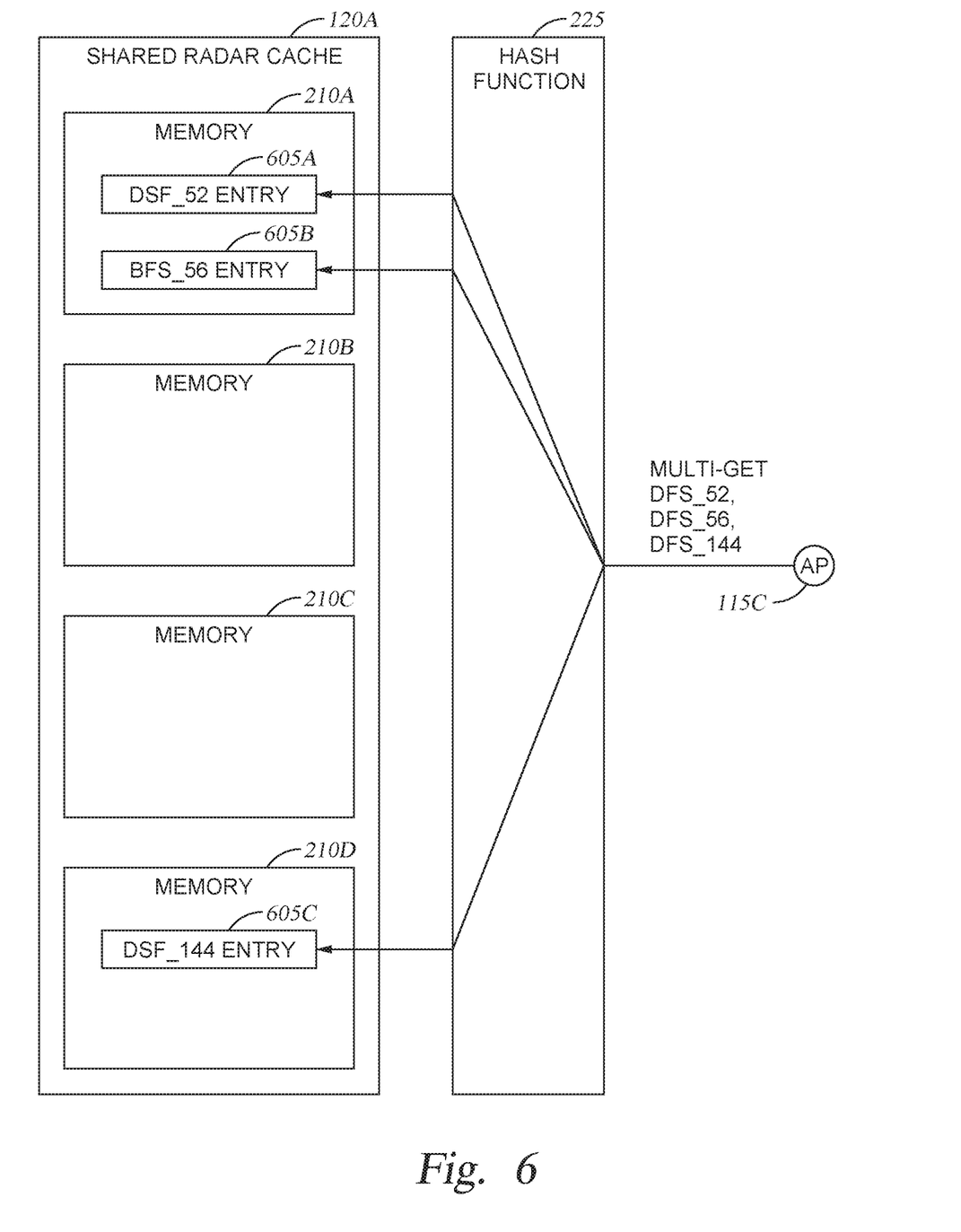
FIG. 6 illustrates querying a shared radar cache, according to one embodiment.

In FIG. 6, the AP 115C uses a MULTI-GET query to retrieve channel information regarding the DFS channels DFS_52, DFS_56, and DFS_144. Using the hash function 225, the channel selector in the AP 115C can determine that the memory 210A in AP 115A and the memory 210D in the AP 115D store entries 605A-C dedicated to these DFS channels. The AP 115C can then transmit AP-to-AP messages to AP 115A and 115D querying the entries 605A-C.

In response to the MULTI-GET query, the AP 115A can return the radar event (or events) corresponding to DFS_52 and DFS_56. For example, in one embodiment, the shared radar cache 120A may store information regarding only the most recent radar event for the DFS channels. However, in another example, the shared radar cache 120A may store information for multiple radar events (assuming the timeout values for those events have not expired). In one embodiment, if there are no current radar events (e.g., the timeout values for all reported events have expired), the cache 120A may delete the entry for the DFS channel. This indicates to the querying AP that there has not been any recent radar activity detected by any AP in the RF neighborhood. That is, some entries may be null which indicates to the querying AP that the channel has no recent radar events.

Returning to the method 500, at block 515 the channel selector selects one of the candidate channels for further evaluation using the remaining blocks in the method 500. That is, the channel selector can use the remaining blocks to individually evaluate each candidate channel.

At block 520, the channel selector determines whether there was a radar event detected on the selected candidate channel. That is, the channel selector evaluates the data returned from the shared radar cache when performing the query (or queries) described at block 510. If the entry for the candidate channel does not have any history (or the entry was null or had been deleted), then the method proceeds to block 545 to assign a score to the selected candidate channel indicating that there was no radar activity on the channel. In general, the score for a channel where the cache does not store any radar events would be positive to indicate the channel is a good candidate for the new channel.

However, assuming there was at least one radar event stored in the shared radar cache for the selected candidate channel, the method 500 proceeds to block 525 where the channel selector determines whether APs on the same channel or an overlapping channel detected the event. When querying the shared radar cache, the returned data may indicate that multiple APs reported a radar event on the selected candidate channel at roughly the same time. Further, the APs in the RF neighboring may receive status information regarding the other APs from, e.g., the wireless controller. For example, each AP may know the current channel on which the other APs are operating which can be discovered by the APs using a network discovery technique or protocol. If no other APs are operating on the selected candidate channel or overlapping channels, this may indicate that all the APs have moved away from the channel due to the radar event even though a record of these radar events may not be stored in the shared radar cache (if, for example, the shared radar cache stores only the most recently received radar event).

In another example, the APs may track the channel state of the other APs over time using a network discovery technique or protocol. Thus, if the AP determines other APs were previously operating in the selected candidate channel (or a partially overlapping channel), but then switched to a different channel at about the same time as the timestamp in the shared radar cache, the AP can deduce that these APs also detected the radar event. Determining that other APs detected the radar event indicates that the radar event stored in the shared radar cache was actually caused by a radar source rather than being a false positive.

At block 530, the channel selector increases the weight of the radar event to indicate it is a trusted or verified radar event. Thus, when calculating the score of the selected candidate channel at block 545, the weight of the radar event can be used to reduce the score assigned to the channel, thereby indicating that recent radar activity was detected on that channel within the RF neighborhood.

However, returning to block 525, the channel selector may determine, using a network discovery protocol, that no other APs on the same or overlapping channels detected the radar event. For example, using status information provided by the wireless controller, the channel selector may know that another one of the APs in the RF neighborhood is currently operating on the same channel as the selected candidate channel. From this, the channel selector can deduce that that AP did not receive the same radar event as the one recorded in the shared radar cache (since the AP did not move to a different channel). For example, using the status information, the channel selector on AP1 may know that AP2 is currently operating on the selected candidate channel (or a partially overlapping channel), which is the same channel that AP3 reported a radar event which was stored in the shared radar cache. Stated differently, because an AP ID can be stored in the shared radar cache, the AP1 may know after querying the shared radar cache, that AP3 reported a radar event on the selected candidate channel which caused AP3 to move to a different channel. However, the AP1 may also know that AP2 is currently operating on the selected candidate channel, and thus, AP2 did not detect the same radar event as AP3. This may be an indicator that the radar event reported by AP3 was a false positive rather than being caused by an actual radar source.

In that case, the method proceeds to block 535 where the channel selector determines whether the other APs are non-LOS with the AP that detected the radar event. For APs that are within LOS of each other, it is expected that a radar source detected by one of the APs should be detected by the other APs. That is, if two APs are within LOS, there are likely no environmental objects or RF conditions that would prevent one AP from detecting a radar source that another AP operating on the same channel (or a partially overlapping channel) detected. However, if the APs operating on the same or partially overlapping channel are not within LOS of each other, then there could be scenario where one AP detected an actual radar event while the other AP did not. Such a scenario is illustrated in FIG. 7.

Figure 7:
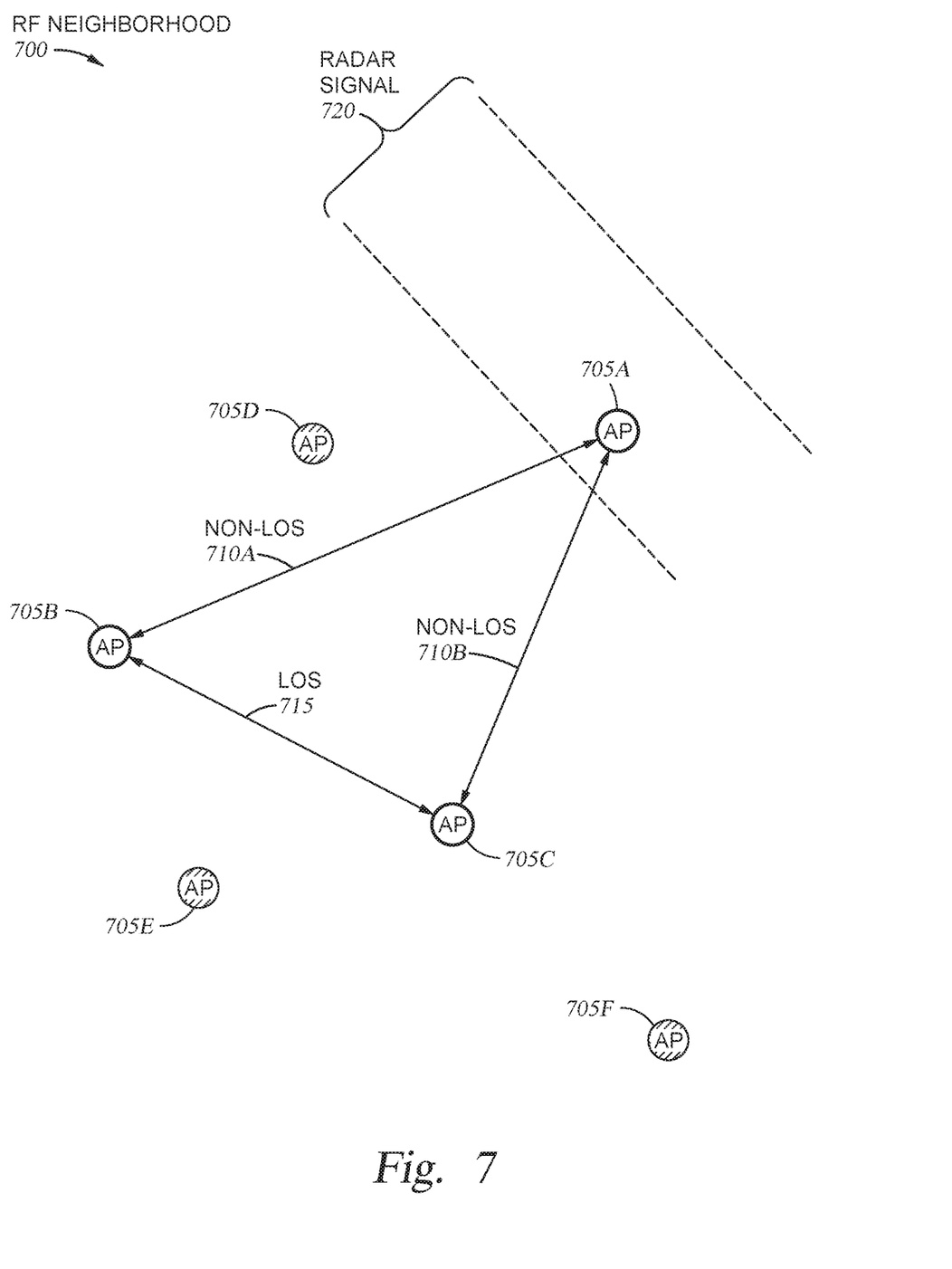
FIG. 7 illustrates line of sight (LOS) and non-LOS APs in the same group, according to one embodiment.

FIG. 7 illustrates LOS and non-LOS APs in the same group, according to one embodiment. That is, FIG. 7 illustrates an RF neighborhood 700 that includes APs 705A-F. In this example, the APs 705A-C operate on a same channel or on partially overlapping channels while the APs 705D-F do not. Further, the APs 705B and 705C are within LOS 715 of each other while the AP 705A is not within LOS of either AP 705B or 705C as indicated by the non-LOS paths 710A and 710B. This may be due to the physical environment within the RF neighborhood 700. In one embodiment, frames transmitted by the APs 705 can be heard either in LOS where APs 705 on the ceiling can hear each other or via reflections/multi-path (non-LOS). For example, the AP 705A may be in a different room than the APs 705B and 705C, or there may be objects disposed between AP 705A and the APs 705B and 705C.

At a specific time a radar source (e.g., a weather station) nearby transmits a radar signal 720 and the AP 705A situated in its propagated path detects its radar signature. Radar pulses are known to be short duration, narrow channel width, high energy, and can be directional. Thus, only a subset of the APs 705 in the neighborhood 700 within the propagation path and operate on the same frequencies as the signal 720 are able to detect a radar event. In this case, only the AP 705A detects the radar signal 720. For example, the objects or RF conditions between the AP 705A and the APs 705B and 705C which make these APs have non-LOS relationship also prevent the APs 705B and 705C from detecting the radar signal 720. Thus, despite the APs 705A-C operating on the same channel, the AP 705A detecting a radar event when the APs 705B and 705C do not is not an indicator that the radar event is a false positive.

In one embodiment, current or future IEEE 802.11 protocols can provide techniques for the APs 705 to determine whether they are within LOS or non-LOS of neighboring APs. The channel selectors can then use this information to determine whether to increase the weight or decrease the weight of the detected radar events stored in the shared radar cache.

Returning to block 525 of the method 500, if the other APs are non-LOS with the AP that detected the radar event, the method proceeds to block 530 to increase the weight of the radar event. Doing so indicates the channel selector has determined the radar event is most likely an actual radar event. Conversely, if one of the other APs is LOS with the AP that detected the radar event, the method instead proceeds to block 540 where the channel selector decreases the weight of the radar event. That is, because the APs are LOS (and operating on the same channel or a partially overlapping channel), it is more likely the other AP should have detected the radar event but did not, thereby indicating the radar event is more likely a false positive. The channel selector can decrease a weight associated with the radar event.

At block 545, the channel selector assigns a score to the selected candidate channel using the weight determined at block 530 or block 540 (assuming the selected candidate channel has a radar event stored in the shared radar cached). For example, if the weight of the radar event was increased at block 530, the channel selector may decrease the score of the candidate channel to indicate there is a greater likelihood that the AP would detect radar on that channel. Put differently, a lower score means the channel selector is less likely to select the channel since the AP is more likely to experience a radar event (and have to repeat the method 300 to again select a new channel). Conversely, if the weight of the radar event was decreased at block 540, the channel selector may increase the score of the candidate channel to indicate it is less likely the AP would detect radar on that channel. In this manner, the weights of the radar events can influence the score of the channels and whether they are more (or less) attractive options.

The weights of the radar events (and the scores of the channels) can also be set based on other factors than those discussed in blocks 525 and 535. For example, the weights may be adjusted based on the time the last radar event was detected. In that example, the channel selector may evaluate the timestamp or the remaining time of the timeout value stored in the shared radar cache to adjust the weight of the radar event. Further, the APs may store a history of radar events for each channel which can be used to adjust the weights. Although one channel may not currently have any radar events stores in the shared radar cache, the history of the channel (which can be stored locally in the APs or in a separate location of the shared radar cache) may indicate a significant amount of radar on the channel which may reduce its score.

The method 500 then repeats at block 550 if there are more candidate channels which have not yet been scored. However, assuming the candidate channels identified at block 505 have all been scored, the method proceeds to block 555 where the channel select selects a new channel using the scores. For example, the channel selector may select the candidate channel with the highest score. If there is a tie, the channel selector may use any number of suitable tie breaking criteria such as radar history of a channel, the utilization of the channels (e.g., the number of other APs already using the channel), the bandwidth of the channels, and the like.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   detecting, at a first access point (AP), a first event when operating on a dynamic frequency selection (DFS) channel causing the first AP to vacate the DFS channel;
   updating an entry corresponding to the DFS channel in a shared cache in response to the first event, wherein:
      the shared cache is shared by a plurality of APs and is hosted in memory of at least one of the plurality of APs;
      the shared cache is distributed across memories in multiple ones of the plurality of APs; and
      the memories store entries of the shared cache that correspond to different DFS channels, and
   selecting a new DFS channel at the first AP based on information stored in the shared cache associated with the new DFS channel, wherein selecting the new DFS channel at the first AP comprises:
      identifying candidate DFS channels;
      querying the memories storing the shared cache using multiple messages to identify radar events corresponding to the candidate DFS channels;
      upon determining in response to querying the shared cache that a second AP of the plurality of APs detected a radar event on a first candidate channel, determining whether another one of the plurality of APs operating on at least one of the first candidate channel or an overlapping channel also detected the radar event;
      upon determining no other APs operating on at least one of the first candidate channel or the overlapping channel detected the radar event, determining whether the second AP is non-line-of-sight (non-LOS) with the other APs operating on at least one of the first candidate channel or the overlapping channel; and
      upon determining the second AP is non-LOS with the other APs operating on at least one of the first candidate channel or the overlapping channel, indicating in a score corresponding to the first candidate channel that the radar event is likely not a false positive.

2. The method of claim 1, wherein updating the entry corresponding to the DFS channel comprises:
   determining which memory of the memories contains the entry corresponding to the DFS channel; and
   transmitting a message to a second AP of the plurality of APs that includes the memory with the entry corresponding to the DFS channel.

3. The method of claim 2, wherein determining which memory of the memories contains the entry corresponding to the DFS channel is performed using a hash function.

4. The method of claim 2, wherein the message comprises an ID of the first AP and a timeout value corresponding to the first event, both of which are stored at the entry corresponding to the DFS channel, wherein the timeout value indicates how long the first AP is prohibited from using the DFS channel.

5. The method of claim 1, wherein querying the memories storing the shared cache comprises:
   using a hash function to identify locations in the memories corresponding to the candidate DFS channels.

6. A non-transitory computer readable medium having program instructions embodied therewith, the program instructions executable by a processor to perform an operation, the operation comprising:
   detecting, at a first AP, a first event when operating on a DFS channel causing the first AP to vacate the DFS channel;
   updating an entry corresponding to the DFS channel in a shared cache in response to the first event, wherein:
      the shared cache is shared by a plurality of APs and is hosted in memory of at least one of the plurality of APs; and
      the shared cache comprises a plurality of entries, each dedicated for storing information for only one of a plurality of DFS channels, and
   selecting a new DFS channel at the first AP based on information stored in the shared cache associated with the new DFS channel, comprising:
      querying memories storing the shared cache using multiple messages to identify radar events corresponding to candidate DFS channels, comprising:
         using a hash function or an address table with a DFS channel as a key to identify one of the plurality of entries in the memories corresponding to one of the candidate DFS channels.

7. The computer readable medium of claim 6, wherein the shared cache is distributed across the memories in multiple ones of the plurality of APs, wherein the memories store entries of the shared cache that correspond to different DFS channels.

8. The computer readable medium of claim 7, wherein updating the entry corresponding to the DFS channel comprises:
   determining which memory of the memories contains the entry corresponding to the DFS channel; and
   transmitting a message to a second AP of the plurality of APs that includes the memory with the entry corresponding to the DFS channel.

9. The computer readable medium of claim 8, wherein the message comprises an ID of the first AP and a timeout value corresponding to the first event, both of which are stored at the entry corresponding to the DFS channel, wherein the timeout value indicates how long the first AP is prohibited from using the DFS channel.

10. The computer readable medium of claim 6, wherein selecting the new DFS channel at the first AP comprises:
    upon determining in response to querying the shared cache that a second AP of the plurality of APs detected a radar event on a first candidate channel, determining whether another one of the plurality of APs operating on at least one of the first candidate channel or an overlapping channel also detected the radar event;
    upon determining no other APs operating on at least one of the first candidate channel or the overlapping channel detected the radar event, determining whether the second AP is non-LOS with the other APs operating on at least one of the first candidate channel or the overlapping channel; and
    upon determining the second AP is non-LOS with the other APs operating on at least one of the first candidate channel or the overlapping channel, indicating in a score corresponding to the first candidate channel that the radar event is likely not a false positive.

11. A computing device, comprising:
a processor; and
memory storing a program executable by the processor to perform an operation, the operation comprising:
   detecting a first event when operating on a DFS channel causing the computing device to vacate the DFS channel;
   updating an entry corresponding to the DFS channel in a shared cache in response to the first event, wherein:
      the shared cache is shared by a plurality of wireless computing devices and is hosted in memory of at least one of the plurality of wireless computing devices; and
      the shared cache comprises a plurality of entries, each dedicated for storing information for only one of a plurality of DFS channels, and
   selecting a new DFS channel based on information stored in the shared cache associated with the new DFS channel, comprises:
      identifying candidate DFS channels;
      querying memories storing the shared cache using multiple messages to identify radar events corresponding to the candidate DFS channels;
      upon determining in response to querying the shared cache that a second computing device of the plurality of wireless computing devices detected a radar event on a first candidate channel, determining whether another one of the plurality of wireless computing devices operating on at least one of the first candidate channel or an overlapping channel also detected the radar event;
      upon determining no other wireless computing devices operating on at least one of the first candidate channel or the overlapping channel detected the radar event, determining whether the second computing device is non-line-of-sight (non-LOS) with the other wireless computing devices operating on at least one of the first candidate channel or the overlapping channel; and
      upon determining the second computing device is non-LOS with the other wireless computing devices operating on at least one of the first candidate channel or the overlapping channel, indicating in a score corresponding to the first candidate channel that the radar event is likely not a false positive.

12. The computing device of claim 11, wherein the shared cache is distributed across the memories in multiple ones of the plurality of wireless computing devices, wherein the memories store entries of the shared cache that correspond to different DFS channels.

13. The computing device of claim 12, wherein updating the entry corresponding to the DFS channel comprises:
   determining which memory of the memories contains the entry corresponding to the DFS channel; and
   transmitting a message to a second computing device of the plurality of wireless computing devices that includes the memory with the entry corresponding to the DFS channel.

14. The computing device of claim 13, wherein the message comprises an ID of the computing device and a timeout value corresponding to the first event, both of which are stored at the entry corresponding to the DFS channel, wherein the timeout value indicates how long the computing device is prohibited from using the DFS channel.

* * * * *

UNITED STATES PATENT AND TRADEMARK OFFICE
CERTIFICATE OF CORRECTION

PATENT NO. : 11,855,914 B2
APPLICATION NO. : 16/698573
DATED : December 26, 2023
INVENTOR(S) : Santosh B. Kulkarni et al.

It is certified that error appears in the above-identified patent and that said Letters Patent is hereby corrected as shown below:

On the Title Page

On the page 2, in Column 2, item (56) under "Other Publications", Line 5, delete "critcial" and insert -- critical --.

In the Specification

In Column 4, Line 30, delete "120A" and insert -- 120A. --.

In Column 6, Line 51, delete "115б" and insert -- 115B --.

In Column 6, Line 55, delete "115б" and insert -- 115B --.

In Column 6, Line 57, delete "115б" and insert -- 115B --.

In Column 6, Line 60, delete "115б" and insert -- 115B --.

In Column 6, Line 67, delete "115б" and insert -- 115B --.

In Column 9, Line 35, delete "that that" and insert -- that --.

Signed and Sealed this
Twentieth Day of August, 2024

Katherine Kelly Vidal
*Director of the United States Patent and Trademark Office*